United States Patent Office 3,447,903
Patented June 3, 1969

3,447,903
SULPHUR PRODUCTION
Tadeusz K. Wiewiorowski, New Orleans, La., assignor to Freeport Sulphur Company, New York, N.Y., a corporation of Delaware
Filed Oct. 27, 1966, Ser. No. 590,022
Int. Cl. C01b 17/04
U.S. Cl. 23—226                               17 Claims

ABSTRACT OF THE DISCLOSURE

An improved process for the production and recovery of elemental sulphur from the reaction of hydrogen sulfide and sulphur dioxide. The improvement comprising performing the process in liquid sulphur in the presence of a basic nitrogen compound catalyst having an equilibrium constant ($K_B$ value) greater than $10^{-10}$.

---

Figure 1:
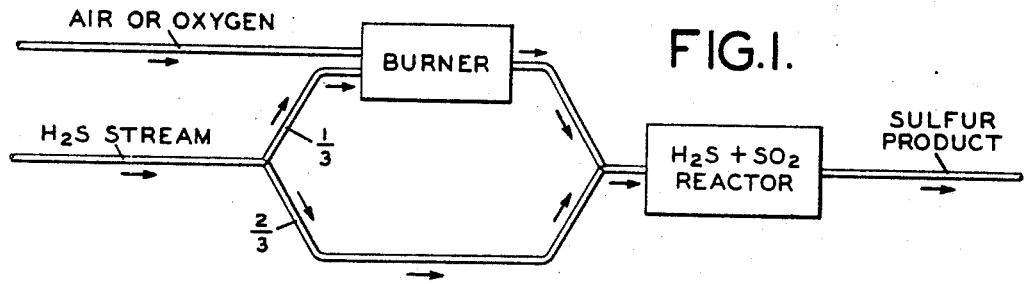

This invention relates to the production of elemental sulphur and more particularly relates to methods which enhance the conversion of hydrogen sulfide and sulphur dioxide into elemental sulphur and water in accordance with the following equation:

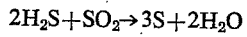

$$2H_2S + SO_2 \rightarrow 3S + 2H_2O$$

Industrially, the most significant utilization of the reaction of hydrogen sulfide and sulphur dioxide is the recovery of sulphur from gas streams containing hydrogen sulfide or sulphur dioxide. For example, in various modifications of the Claus Process, hydrogen sulfide and sulphur dioxide are reacted on a catalyst to yield elemental sulphur and water vapor.

The reaction between hydrogen sulfide and sulphur dioxide, although thermodynamically favorable, is very slow in the absence of catalysts at ordinary temperatures. However, several methods of catalyzing this reaction are known. The most widely recognized methods known to those skilled in the art are the Townsend Process and modifications of the Claus Process. In the Townsend Process the catalytic reaction of hydrogen sulfide and sulphur dioxide is carried out at low temperatures in a hygroscopic organic liquid, such as diethylene glycol, containing less than ten percent by weight of water. However, the Townsend Process has the distinct disadvantage that the produced elemental sulphur forms a slurry with the organic reaction medium, which necessitates a subsequent separation step in the process. Another method of catalytically reacting hydrogen sulfide with sulphur dioxide is practiced in various modifications of the Claus Process. This method consists of passing the gas stream through a catalytic converter. One disadvantage of this method is that the converters have to be operated at relatively high temperatures, specifically, at temperatures above the dew point of sulphur, resulting in the necessity of employing condensers to liquefy the sulphur that is produced in the vapor phase. Moreover, the presence of gases other than the reactants in the gas stream frequently has a detrimental effect on the solid catalysts used in modifications of the Claus Process. It is partially for this reason that gas streams fed to Claus converters are previously treated to remove the hydrocarbons and to concentrate the sulphur gases. The Claus Process has the further disadvantage of being relatively expensive because of the cost involved in compressing the gases fed to the converter and because of the limited lifetime of the catalyst.

Thus, it is desirable to obtain a more efficient and economical method by which hydrogen sulfide and sulphur dioxide could be reacted together to yield elemental sulphur.

It is an object of the present invention to provide a method which enhances the recovery of elemental sulphur from the reaction of hydrogen sulfide and sulphur dioxide.

It is another object of this invention to provide a method of sulphur production from the reaction of hydrogen sulfide and sulphur dioxide, in which the elemental sulphur is produced in the liquid state.

It is a further object of the present invention to provide a method for decreasing the level of hydrogen sulfide and/or sulphur dioxide contamination in liquid elemental sulphur.

Other objects of the invention wil be apparent to those skilled in the art from reading the present description, taken in conjunction with the appended drawings, in which FIGURES 1, 2, 3 and 4 represent schematic flow diagrams of methods for conducting the present invention.

The objects of this invention may be achieved by adding at least about one part per million of certain catalysts, preferably liquid or solid, to liquid or molten sulphur and then contacting a gas stream containing hydrogen sulfide and sulphur dioxide with the molten sulphur. Surprisingly, it has been discovered that the reaction of hydrogen sulfide with sulphur dioxide in liquid sulphur is very fast if a basic nitrogen compound in accordance with the present invention is present in the liquid sulphur, while in the absence of such a basic nitrogen compound this reaction is very slow.

The catalytic compounds or additives to be added to the liquid sulphur reaction medium which have been found to be effective in the practice of this invention are the basic nitrogen compounds which are soluble in liquid sulphur to the extent of at least about one part per million and which have a $K_B$ value greater than about $10^{-10}$, including the class of compounds consisting of:

(A) Ammonia and its inorganic derivatives having a $K_B$ value greater than $10^{-10}$. Such compounds include hydrazine, hydroxylamine, etc.

(B) Primary, secondary and tertiary, alkyl, aryl and cyclic amines having a $K_B$ value greater than $10^{-10}$. Such amines include: N-butylamine, tetradecyldimethylamine, aniline, cyclohexylamine, N,N-diethylcyclohexylamine, N-methylpyrrolidine, pyridine, tetraethylenepentamine, ethylenediamine, piperidine, indole, 1-(2-aminoethyl)-2-(n-heptadecenyl-2)-imidazoline, n-amylamine, N,N-dimethyloctadecylamine, N,N-dimethyltetradecylamine, N,N-dimethylhexadecylamine, N,N-dimethyloctadecylamine, N,N-dimethylamylamine, α-methylamylamine, propylamine, β,β-dimethylpropylamine, sec-butylamine, isobutylamine, hexylamine, N,N-dimethylhexylamine, n-heptylamine, N,N-dimethylheptylamine, octylamine, tertiary butylamine, α,α-dimethylpropylamine, α,α-dimethylbutylamine, and guanidine. This list of basic nitrogen compounds should not be considered a limitation on the scope of the present invention because there exist many other nitrogen compounds too numerous to mention which may be employed in the present invention.

(C) Quaternary basic nitrogen compounds which decompose between 20° and 160° C. to yield ammonia or its inorganic derivatives having a $K_B$ value greater than $10^{-10}$. Such compounds include ammonium carbonate, ammonium bicarbonate, etc.

(D) Quaternary basic nitrogen compounds which on heating to temperatures between 20 and 160° C. decompose to yield an organic amine having a $K_B$ value greater than $10^{-10}$. Such compounds include tetramethylammonium hydroxide, tetraethylammonium hydroxide, etc.

As used throughout this disclosure the term $K_B$ identifies the equilibrium constant defined by the equation:

$$K_B = \frac{[OH^-] \times [BH^+]}{[B]}$$

which applies to the reaction:

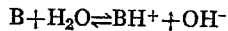

$$B + H_2O \rightleftharpoons BH^+ + OH^-$$

where B is a basic compound, OH⁻ is a hydroxide ion and BH⁺ is the ion formed when a hydrogen ion has been added to the basic compound, and the concentrations [OH⁻], [BH⁺], and [B] are expressed in mols per liter. The equilibrium constant is further described in The Chemistry of Organic Compounds, J. B. Conant and A. H. Blott, Macmillan, 3rd ed., 1947, New York, p. 187, inter alia.

While organic amines having a $K_B$ value of $10^{-10}$ are are suitable in the practice of this invention, improved results are obtained with those organic amines having a $K_B$ value greater than $10^{-8}$.

All of the compounds of paragraphs "A" and "B" hereinabove and all of the decomposition products of paragraphs "C" and "D" contain at least one basic nitrogen atom per molecule. Throughout the present disclosure the compounds of paragraphs "A," "B," "C," and "D," hereinabove, are referred to as "basic nitrogen compounds."

In the invention herein described the reaction between hydrogen sulfide and sulphur dioxide proceeds essentially in the liquid sulphur phase. Consequently, when this invention is utilized in treating the gas stream containing the reacting gases it is important to provide the necessary gas-liquid contact to achieve effective dissolution of the reactants in the liquid-sulphur phase. This can be accomplished through modifications of any of the following well-known methods:

(1) In a packed tower where the sulphuramine solution is introduced at the top and the gases are passed counter-currently through the tower.

(2) In a turbo-mixer where efficient gas-liquid contact is achieved as a result of vigorous agitation.

(3) In spray-type or bubble-cap towers, etc.

Any of the above operations may involve single or multiple stages. Moreover, the scope of the present invention is not to be limited by the choice of the reacting vessel in which the gas-liquid contact and the reaction is carried out.

While the present invention can be practiced at any temperature at which the sulphur is molten, it is desirable to maintain the temperature of the molten sulphur between about 119° and 160° C. Within this temperature range, sulphur has a relatively low viscosity which facilitates the gas-liquid phase contact. At temperatures above about 160° C. sulphur is a relatively viscous liquid, while below about 119° C. solidification occurs. The preferred practice of this invention is to maintain the molten sulphur between 120° and 155° C.

The present invention may be practiced at any pressure range; however, the pressure range preferred in the operation of this invention is at or above atmospheric conditions. Operation at pressures less than atmospheric pressure has the distinct disadvantage that the equipment required to reduce the gas pressure and to carry out the reaction is more expensive and larger for a given sulphur production rate than the equipment using atmospheric pressure. Operation of the present invention at pressures above atmospheric conditions offers the advantage that the required equipment is smaller for a given sulphur production rate.

The basic nitrogen compounds employed in the present invention as a catalyst may be introduced into the molten sulphur as a gas, solid, liquid, or as a solution. The solution may be an aqueous solution or a solution of basic amines in an organic solvent, such as benzene, toluene, carbon tetrachloride, etc. The basic nitrogen compound may be directly injected into the molten sulphur or the catalyst may be added to the gas stream prior to the gas-liquid phase contact. Moreover, the addition may be carried out in a continuous or periodic manner. The preferred method of addition contemplated by this invention is to add the basic amines directly and continuously to the molten sulphur.

The amount of basic nitrogen compound required as a catalyst in the present invention is at least about 0.0001% by weight. Larger amounts may be employed, but no advantage in results is normally obtained in excess of about 0.5% by weight sulphur. These values correspond to between about one to five thousand (1 to 5,000) parts per million by weight of sulphur, the preferred amount being between about one and 100 parts per million, with the optimum being about 50 parts per million. Moreover, the basic nitrogen compounds may be used singly, or two or more may be used together.

The utility of the present invention may be practiced for the purpose of producing elemental sulphur from the reaction of hydrogen sulfide and sulphur dioxide. To accomplish this end, various methods of utilizing this invention will occur to those skilled in the art. Among the desirable methods which may be employed are those shown in the schematic flow diagrams of the appended drawings.

(A) FIG. 1 illustrates a scheme whereby one-third of a hydrogen sulfide gas stream is oxidized in an oxygen burner to produce sulphur dioxide. The resultant mixture of gases, two-thirds hydrogen sulfide and one-third sulphur dioxide, is directed into the reaction chamber containing the molten sulphur and basic nitrogen catalyst in accordance with this invention.

Figure 2:
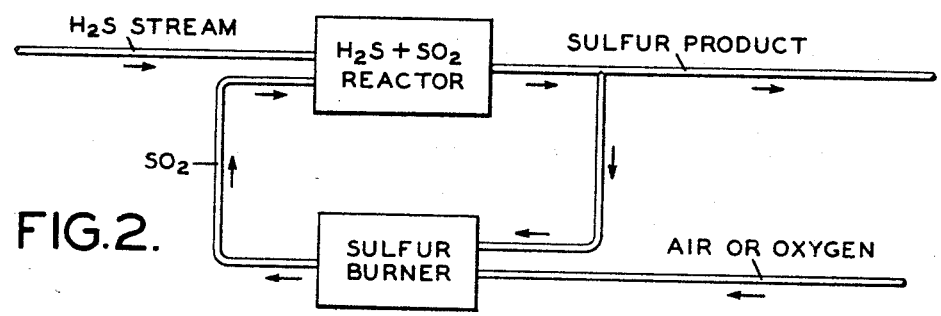

(B) FIG. 2 represents a flow-diagram whereby a portion of the produced elemental sulphur is recycled through a sulphur burner where the sulphur is oxidized to yield sulphur dioxide. The resultant mixture of gases, two-thirds hydrogen sulfide and one-third sulphur dioxide, is directed into the reaction chamber containing the molten sulphur and basic nitrogen catalyst in accordance with this invention.

Figure 3:
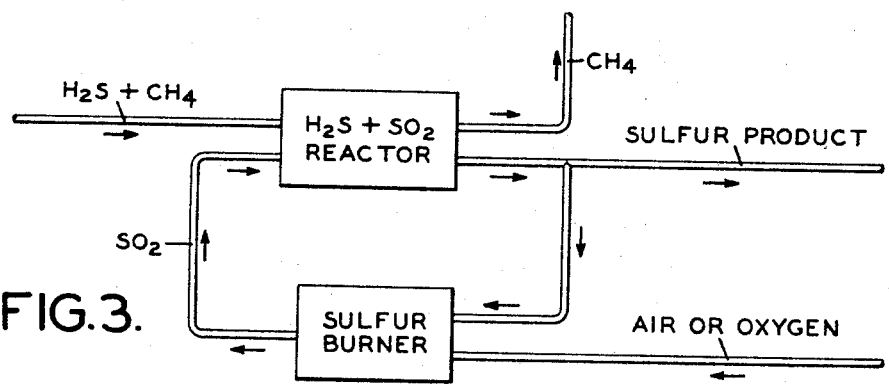

(C) The utility of the present invention may be practiced for the purpose of removing small concentrations of hydrogen sulfide from a gas stream. FIG. 3 represents a scheme of removing hydrogen sulfide from a gas stream containing 99% methane and 1% hydrogen sulfide. A portion of elemental sulphur is recycled through a sulphur burner where the sulphur is oxidized to yield sulphur dioxide. The sulphur dioxide is directed into the reaction chamber for reaction with the incoming gas stream containing 99% methane and 1% hydrogen sulfide. The methane stream is purified as a result of this process. A system of this type is useful in the sweetening of natural gas.

Figure 4:
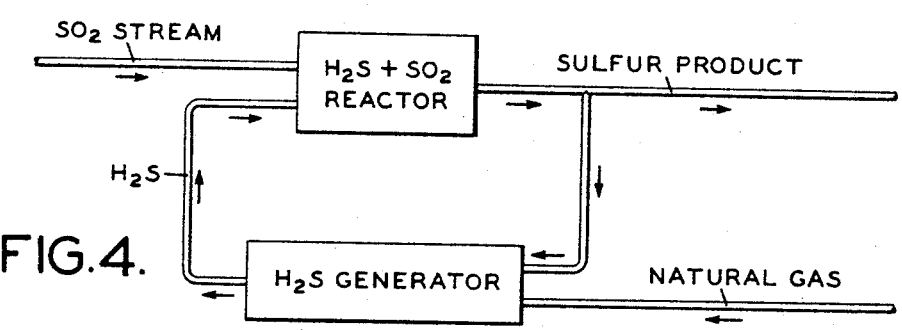

(D) The utility of the present invention may also be practiced for the purpose of producing elemental sulphur from sulphur dioxide. FIG. 4 illustrates a flow-sheet whereby sulphur and natural gas are reacted together in a hydrogen sulfide generator to produce hydrogen sulfide. The resultant hydrogen sulfide gas is then reacted with sulphur dioxide in a reaction chamber to reduce the sulphur dioxide to elemental sulphur in accordance with this invention.

(E) The utility of the present invention may be practiced for the purpose of removing small concentrations of sulphur dioxide from a gas stream. By substituting a gas stream containing 1% sulphur dioxide in some other gas as the source of sulphur dioxide in FIG. 4, the reaction between the hydrogen sulfide produced in the hydrogen sulfide generator and sulphur dioxide in the gas stream may be utilized in purifying gas streams. A system of this type is useful in controlling air pollution by gas streams containing small concentrations of sulphur dioxide.

(F) The invention may also be practiced for the purpose of controlling the purity of liquid sulphur. Industrial sulphur frequently contains small concentrations of hydrogen sulfide which, because of its explosive and toxic properties, is an undesirable impurity. This invention provides a convenient method of removing an impurity, such as hydrogen sulfide, by adding to the sulphur the required amount of basic nitrogen compound and the required stoichiometric amount of sulphur dioxide.

The preferred embodiment of this invention involves reacting hydrogen sulfide with sulphur dioxide in liquid sulphur containing 50 parts per million of ethylenediamine at a temperature of about 155° C. and pressure which is about atmospheric. Preferably, the gas-liquid contact and the reaction are executed in a turbo-mixer in a continuous multiple-stage process. Preferably, the catalyst should be added directly to the liquid sulphur in a continuous manner. Preferably, the gas stream supplying the turbo-mixer should contain between 1% and 67% by volume of hydrogen sulfide and between 0.5% and 34% by volume of sulphur dioxide. Preferably, the molecular ratio of hydrogen sulfide to sulphur dioxide in the gas stream should be about 2:1.

The method of reacting hydrogen sulfide with sulphur dioxide which is disclosed in the present invention offers several distinct advantages over the prior art.

The most important and unique advantage results from the fact that the reaction product is essentially identical with the reaction medium. That is, the elemental sulphur produced in the reaction remains in the liquid sulphur containing the basic nitrogen compound catalyst. This result permits the continuous discharge of liquid sulphur as the reaction is continuously carried out. As a result of this situation, no further processing of the produced sulphur is required. Hence, the present invention overcomes the disadvantage of the Townsend Process, where the produced sulphur forms a slurry with the organic reaction medium and has to be separated by a subsequent step in the process.

Another distinct advantage of the present invention is that the reaction between hydrogen sulfide and sulphur dioxide may be carried out in the presence of other gases, such as hydrocarbons and carbon dioxide. The presence of gases other than hydrogen sulfide and sulphur dioxide in the gas stream frequently has a detrimental effect on the solid catalysts used in modifications of the Claus Process. It is partially for this reason that, generally, gas streams directed to Claus converters are previously treated to remove the hydrocarbons and concentrate the sulphur gases. This pretreatment, and associated expenses, may be eliminated by practicing the present invention.

In order to more clearly disclose the nature of the present invention, specific examples of the practice of the invention are hereinafter given. It should be understood, however, that this is done solely by way of example and is intended neither to delineate the scope of the invention nor limit the ambit of the appended claims. Unless otherwise stated, amounts are expressed in terms of parts by weight.

EXAMPLE 1

An infrared cell as described in Analytical Chemistry, 37, 1080 (1965), equipped with a ½ inch light path, was filled with pure liquid sulphur. The molten sulphur was maintained at a temperature of 140° C. and at atmospheric pressure. The molten sulphur was saturated with a hydrogen sulfide and sulphur dioxide gas stream in a molecular ratio of two $H_2S$ to one $SO_2$. The infrared spectrum of this system was obtained. After a considerable period of time, the absorption bands assigned to hydrogen sulfide and sulphur dioxide remained unaltered, and no band which could be assigned to water appeared. This indicated that, essentially, no reaction was taking place. The sulfur in the cell was then charged with 50 parts per million by weight of ethylenediamine. Immediately, the infrared spectrum indicated the disappearance of the hydrogen sulfide and sulphur dioxide bands and the formation of a band due to water. This indicated that the reaction between hydrogen sulfide and sulphur dioxide dissolved in molten sulphur is very fast and complete when a basic nitrogen compound catalyst of the present invention is present in the molten sulphur.

EXAMPLES 2–8

The procedure as outlined in Example 1, above, was repeated, with similar results, substituting the additives listed in Table I for ethylenediamine:

TABLE I

| Example No.: | Additive |
|---|---|
| 2 | Ammonia |
| 3 | Tetradecyldimethylamine |
| 4 | Ammonium carbonate |
| 5 | Ammonium bicarbonate |
| 6 | Diethylenetriamine |
| 7 | Dicyclohexylamine |
| 8 | Pyridine |

In each of the Examples 2–8, when 50 parts per million by weight of the additive were introduced to the liquid sulphur, there was an immediate disappearance of the infrared spectrums for hydrogen sulfide and sulphur dioxide and the appearance of a band for water. This indicated that the reaction between hydrogen sulfide and sulphur dioxide dissolved in liquid sulphur is very fast in the presence of a basic nitrogen compound as a catalyst.

EXAMPLE 9

A glass test tube, 13 inches in height and 2 inches in diameter, was filled with 10 inches of liquid sulphur containing 50 parts per million by weight of ethylenediamine. The glass test tube was wrapped with a heating mantle to maintain the liquid sulphur at 155° C. A gas mixture, by volume, consisting of 20% hydrogen sulfide, 10% sulphur dioxide and 70% nitrogen was bubbled into the bottom of the test tube through a frit at the rate of 60 ml./min. Throughout the 24 hour run, the effluent gases from this reaction vessel were periodically analyzed for hydrogen sulfide and sulphur dioxide. An average sulphur recovery of about 50% was accomplished in this single-stage operation.

EXAMPLE 10

An electrically heated tank, 2 feet in height and 16 inches in diameter, equipped with a turbo-mixer having a ¼ horsepower electric motor and a 4-inch impeller suspended below a hood ring and operating at about 800 revolutions per minute, was charged with 80 pounds of liquid sulphur containing 50 parts per million of ethylenediamine. The electrically heated tank maintained the liquid sulphur at 155° C. Hydrogen sulfide and sulphur dioxide were admitted below the turbo-mixer at a rate of 5 and 2.5 standard cubic feet per hour, respectively. The surface of the sulphur phase was swept with 25 standard cubic feet per hour of nitrogen. Analysis of the effluent gases indicated that the reaction between hydrogen sulfide and sulphur dioxide was 95% complete.

EXAMPLE 11

1000 grams of liquid sulphur at 155° C. containing 0.03% of dissolved hydrogen sulfide was treated with 5 milligrams of ethylenediamine. Sulphur dioxide was then bubbled through the liquid sulphur. Analysis of the liquid sulphur indicated that the hydrogen sulfide contamination was reduced to a negligible concentration level.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A process for the production of elemental sulphur, consisting essentially of reacting hydrogen sulfide and sulphur dioxide in liquid sulphur containing at least about one part per million of a catalyst comprising a basic nitrogen compound having a $K_B$ value of greater than $10^{-10}$ and which compound is soluble in molten sulphur in an amount of at least about one part per million.

2. A process for the production of elemental sulphur according to claim 1 wherein the liquid sulphur contains at least about one part per million up to about 100 parts per million of a catalyst consisting essentially of at least one member of a class of compounds consisting of (A) ammonia and its inorganic derivatives having a $K_B$ value greater than $10^{-10}$; (B) primary, secondary and tertiary, alkyl, aryl and cyclic amines having a $K_B$ value greater than $10^{-10}$; (C) inorganic ammonium salts which decompose below 160° C. to yield ammonia and its inorganic derivatives having a $K_B$ value greater than $10^{-10}$ and (D) quaternary basic nitrogen compounds which decompose below 160° C. to yield an organic amine having a $K_B$ value greater than $10^{-10}$.

3. A process for the production of elemental sulphur in accordance with claim 1 wherein said $K_B$ value is greater than $10^{-8}$.

4. A process for the production of elemental sulphur in accordance with claim 1 wherein the amount of basic nitrogen compound present in the liquid sulphur does not exceed about 5000 parts per million.

5. A process for the production of elemental sulphur in accordance with claim 1 wherein the amount of basic nitrogen compound is between about 1 and 100 parts per million.

6. A process for the production of elemental sulphur in accordance with claim 1, which consists of reacting hydrogen sulfide and sulphur dioxide, in a molecular ratio of about 2 parts hydrogen sulfide to 1 part sulphur dioxide, in the liquid sulphur containing at least about 1 part per million up to about 100 parts per million of a catalyst consisting essentially of at least one member of a class of compounds consisting of (A) ammonia and its inorganic derivatives having a $K_B$ value greater than $10^{-10}$; (B) primary, secondary and tertiary, alkyl, aryl and cyclic amines having a $K_B$ value greater than $10^{-10}$; (C) inorganic ammonium salts which decompose below 160° C. to yield ammonia and its inorganic derivatives having a $K_B$ value greater than $10^{-10}$; and (D) quaternary basic nitrogen compounds which decompose below 160° C. to yield an organic amine having a $K_B$ value greater than $10^{-10}$.

7. A process for the production of elemental sulphur in accordance with claim 1 wherein the liquid sulphur is maintained at a temperature between about 119° C. and 160° C.

8. A process for the production of elemental sulphur in accordance with claim 1 wherein the liquid sulphur is maintained at a temperature between about 119° and 160° C., and said liquid sulphur contains about 50 parts per million of a catalyst consisting essentially of at least one member of a class of compounds consisting of (A) ammonia and its inorganic derivatives having a $K_B$ value greater than $10^{-10}$; (B) primary, secondary and tertiary, alkyl, aryl and cyclic amines having a $K_B$ value greater than $10^{-10}$; (C) inorganic ammonium salts which decompose below 160° C. to yield ammonia and its inorganic derivatives having a $K_B$ value greater than $10^{-10}$; and (D) quaternary basic nitrogen compounds which decompose below 160° C. to yield an organic amine having a $K_B$ value greater than $10^{-10}$.

9. A process for the production of elemental sulphur in accordance with claim 8 wherein said $K_B$ value is greater than $10^{-8}$.

10. A process for the production of elemental sulphur in accordance with claim 1 wherein said liquid sulphur contains ethylenediamine as the basic nitrogen compound.

11. A method for the removal of hydrogen sulfide and sulphur dioxide from gas streams or liquid sulphur which consists of reacting hydrogen sulfide with sulphur dioxide, in liquid sulphur, maintained between 119° and 160° C. containing at least about one part per million up to about 100 parts per million of a catalyst consisting essentially of at least one member of a class of compounds consisting of (A) ammonia and its inorganic derivatives having a $K_B$ value greater than $10^{-10}$; (B) primary, secondary and tertiary, alkyl, aryl and cyclic amines having a $K_B$ value greater than $10^{-10}$; (C) inorganic ammonium salts which decompose below 160° C. to yield ammonia and its inorganic derivatives having a $K_B$ value greater than $10^{-10}$; and (D) quaternary basic nitrogen compounds which decompose below 160° C. to yield an organic amine having a $K_B$ value greater than $10^{-10}$.

12. A method according to claim 11 whereby hydrogen sulfide is removed from a gas stream by bringing sulphur dioxide into contact with the gas stream in the presence of the liquid sulphur.

13. A method according to claim 11 whereby hydrogen sulfide is removed as a contaminant of liquid sulphur by bringing sulphur dioxide into contact with the liquid sulphur.

14. A method according to claim 11 whereby sulphur dioxide is removed from a gas stream by bringing hydrogen sulfide into contact with the gas stream in the presence of the liquid sulphur.

15. A method according to claim 11 whereby sulphur dioxide is removed as a contaminant of liquid sulphur by bringing hydrogen sulfide into contact with the liquid sulphur.

16. A method for the removal of hydrogen sulfide from liquid sulphur in accordance with claim 11 wherein sulphur dioxide is added to liquid sulphur containing dissolved hydrogen sulfide and at least about one part per million of ethylenediamine.

17. A method for reducing the concentrations of hydrogen sulfide and sulphur dioxide contaminants, when both are present, in liquid sulphur wherein at least about one part per million, up to about 100 parts per million, of a catalyst is added to the contaminated liquid sulphur, said catalyst consisting essentially of at least one member of a class of compounds consisting of (A) ammonia and its inorganic derivatives having a $K_B$ value greater than $10^{-10}$; (B) primary, secondary, and tertiary alkyl, aryl, and cyclic amines having a $K_B$ value greater than $10^{-10}$; (C) inorganic ammonium salts which decompose below 160° C. to yield ammonia or its inorganic derivatives having a $K_B$ value greater than $10^{-10}$; and (D) quaternary basic nitrogen compounds which decompose below 160° C. to yield an organic amine having a $K_B$ value greater than $10^{-10}$.

References Cited

UNITED STATES PATENTS

| | | | |
|---|---|---|---|
| 927,342 | 7/1909 | Feld et al. | 23—225 |
| 1,083,249 | 12/1913 | Hall | 23—225 |
| 2,724,641 | 11/1955 | Butler et al. | 23—225 |
| 2,994,588 | 8/1961 | Eickmeyer | 23—225 |
| 3,034,865 | 5/1962 | Urban | 23—225 |
| 3,278,269 | 10/1966 | Ekker et al. | 23—224 |

OSCAR R. VERTIZ, *Primary Examiner.*

G. O. PETERS, *Assistant Examiner.*

U.S. Cl. X.R.

23—2